United States Patent [19]

Korsell

[11] Patent Number: 4,732,713
[45] Date of Patent: Mar. 22, 1988

[54] INSERTABLE CONTACT BODY

[75] Inventor: Lars Korsell, Sollentuna, Sweden

[73] Assignee: Aktiebolaget Carl Munters, Sollentuna, Sweden

[21] Appl. No.: 779,232

[22] Filed: Sep. 23, 1985

[30] Foreign Application Priority Data

Oct. 3, 1984 [SE] Sweden ............................ 8404959

[51] Int. Cl.$^4$ .............................................. B01F 3/04
[52] U.S. Cl. ..................................... 261/112; 165/166
[58] Field of Search ......................... 261/112; 165/166

[56] References Cited

U.S. PATENT DOCUMENTS

| | | | |
|---|---|---|---|
| 2,596,642 | 5/1952 | Boestad | 261/112 |
| 2,940,736 | 6/1960 | Odman | 261/112 |
| 3,132,190 | 5/1964 | Engelitcheff, Jr. | 261/112 |
| 3,346,246 | 10/1967 | Loetel et al. | 261/112 |
| 3,466,019 | 9/1969 | Priestley | 261/112 |
| 3,733,063 | 5/1973 | Loetel et al. | 261/112 |
| 3,972,841 | 2/1974 | Munters | 261/112 |
| 4,099,928 | 7/1978 | Norback | 261/112 |
| 4,337,216 | 6/1982 | Korsell | 261/112 |
| 4,396,058 | 8/1983 | Kurschner et al. | 165/166 |
| 4,534,337 | 8/1985 | Janson | 165/166 |

FOREIGN PATENT DOCUMENTS

| | | | |
|---|---|---|---|
| 1058077 | 5/1959 | Fed. Rep. of Germany | 261/112 |
| 1320500 | 6/1973 | United Kingdom | 261/112 |

Primary Examiner—Tim Miles
Attorney, Agent, or Firm—Curtis, Morris & Safford

[57] ABSTRACT

An insertable contact body for one medium or several media, e.g. for heat exchangers, cooling towers, scrubbers or the like, which body is composed of sheets (10, 12; 20, 22; 28; 32) provided with folds or corrugations. The sheets are arranged adjacent one another in such a manner that the folds in adjacent sheets extend angularly relative one another. The sheets are arranged at a distance from one another, whereby a major part of those folds which form an angle with each other are separated from one another by an interspace between their crest without the same bearing against one another. This is preferably accomplished by means of distance members (18; 24; 30; 34), by which the sheets are kept at the said distance.

8 Claims, 4 Drawing Figures

INSERTABLE CONTACT BODY

The present invention relates to an insertable contact body for one medium or several media, which body is composed of layers or sheets provided with folds or corrugations and which are disposed adjacent one another, the folds in adjacent sheets forming an angle with one another.

Insertable contact bodies of this kind are used in, for example, scrubbers, heat exchangers etc. A particularly important field of application is constituted by cooling towers, wherein water is cooled by direct contact with streaming air. In this connection it has been proposed to spread the streaming media over the surface of the sheets by forming the insertable contact bodies in adjacent sheets with folds crossing each other angularly, the sheets then bearing against one another and if desired being interconnected at the crossing places. Then the crossing or bearing places constitute deflecting points for the supplied media such as water and air so that good spreading is obtained over the surface of the sheet.

For an effective utilization of the surfaces it is of extreme importance that the gaseous medium such as air is imparted a turbulence so that all portions of the gas are brought into good contact with the sheets and/or the liquid medium streaming on the sheets. From this point of view the described structure is highly effective due to the fact that the channels formed between the sheets have a constantly varying width from zero at the places of contact to the double of the height of the folds. However, the turbulences also have a negative effect by increasing the pressure fall during the passage of the gas between the sheets. It is possible to have an effect on both the pressure fall and the intensity of contact by changing the angles between the crossing sheets, and in this way one has tried earlier to find a suitable compromise between the demands on low pressure fall and high transfer coefficient.

The main object of the invention is to provide an insertable contact body, in which a reduction of the pressure falls is brought about without a corresponding reduction of the transfer intensity, and it has surprisingly become apparent that this can be attained while maintaining a substantially unchanged geometrical shape of the individual sheets by installing them in relation to one another in the manner set forth in the characteristic features of the subsequent claims.

The invention will be described better in connection with embodiments shown in the attached drawings.

Figure 1:
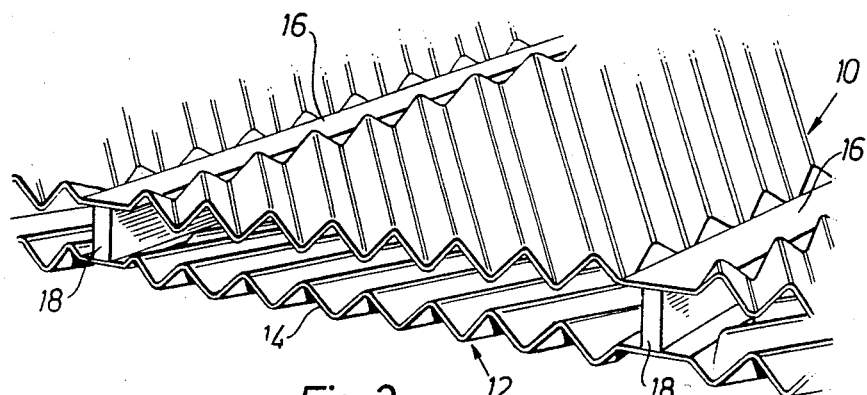
FIG. 1 shows in a perspective view an embodiment with two adjacent sheets in an insertable contact body according to the invention.

In the portion of an insertable contact body according to the invention shown in a perspective view in FIG. 1, there are for the sake of clearness two sheets 10 and 12 only shown, which sheets have folds or corrugations 14 which cross one another in adjacent sheets. The relatively thin sheets 10, 12, may, for example, consist of a plastic material or the like and the folds have mainly a sine shape or are smoothly rounded between the crests and the depressions.

According to the invention the sheets 10, 12 are in the longitudinal direction, i.e. the direction of flow of the media streaming between the sheets, provided with narrow, plane portions 16. These portions 16, which in the assembled contact body are disposed to be situated straightly opposite to one another, are intended to receive between themselves a distance strip 18 which is intended to keep the sheets 10, 12 at such a distance from each other that the folds of the sheets no longer as in earlier known structures bear against one another at the crossing places, but are situated with a predetermined interspace to each other. The distance strips 18 may, for example, be glued to the sheets 10, 12 by means of a suitable binding agent in order to keep the sheets 10, 12 together with the folds 14 with the named predetermined spacing from each other. Other joining methods such as welding and mechanical locking devices can be used. The plane portions 16 make the joining easier when glueing is applied, but it is also possible to join the sheets without these portions.

It has become evident that it is possible when leaving a clearance between the sheets to maintain the turbulences close to the sheet surfaces which produce the high transfer intensity, while at the same time the pressure fall surprisingly is reduced, apparently because the turbulences are not propagated into the central portions of the streaming medium. It is, however, of essential importance that the height of the folds in relation to the width of the passages is not made too low. It has to be substantially higher than a normal boundary layer at plane surfaces in order that the effect in view shall be attained. Then it is especially important that the sheets are overflown by liquid. With too low height of the folds it may occur in this connection that the liquid fills up the fold profile so that the liquid surface does not attain the corresponding fold profile. Suitable values for the height of the folds may be 10 to 20 mms., most suitably 12 mms. with a spacing between the middle lines of the sheets 10, 12 amounting to about 15 to 30 mms., for example 20 mms., the interspace between the crests of the folds 14 then amounting to about 8 to 10 mms.

Figure 2:
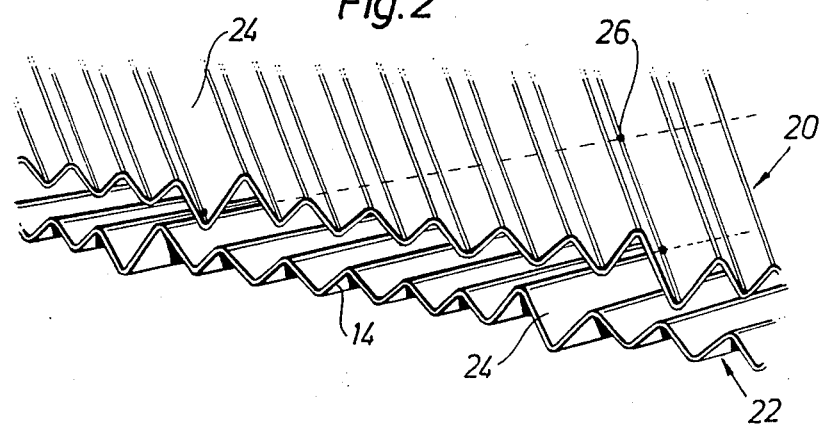
FIG. 2 shows another embodiment of the two sheets.

In the embodiment shown in FIG. 2, a portion of an insertable contact body according to the invention with two adjacent sheets 20, 22 is shown, which as in the embodiment of FIG. 1 are formed with folds 14 crossing one another. In order to produce an interspace between the crests of the folds 14 of the sheets 20, 22 there are in this embodiment certain sheets, for example every 5th or every 10th fold 24 formed with greater height than the other folds 14 presented in the sheets 20, 22. The height of the folds 24 amounts here to the sum of the fold height of the folds 14 and half of the desired spacing between the crests of the folds 14. As is indicated with dashed lines the increased folds 24 in the lower sheet extend in parallel to the other folds 14 as well as the folds 24 in the upper sheet 20. The increased folds 24 in the upper sheet 20 and the lower sheet 22 will at their crossing places 26 bear against one another and may then, if desired, be joined together by means of glueing or welding in order thereby to stiffen the structure of the insertable contact body.

Figure 3:
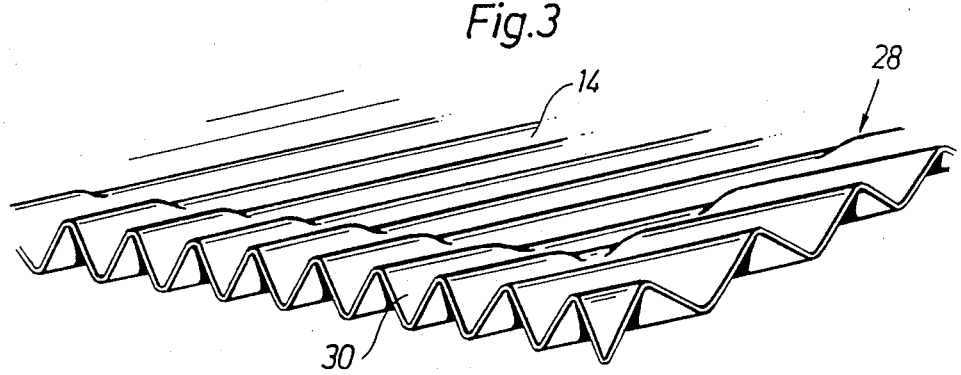
FIG. 3 shows in a perspective view a sheet for utilization in a third embodiment of an insertable contact body.

FIG. 3 shows in a perspective view one single sheet or foil 28 which over its substantially central surface is provided with folds 14 having a uniform height of the folds suited for the intended use. At the edge portions, however, these folds are widened in order to constitute increased edge folds 30, which produce the desired spacing between the folds 14 in two adjacent sheets when several such sheets 28 are assembled for constituting an insertable contact body. Then the sheets 28 are positioned, as already mentioned, with the folds crossing each other and may be joined together, as already described above, at the crossing places between the edge folds 30.

Figure 4:
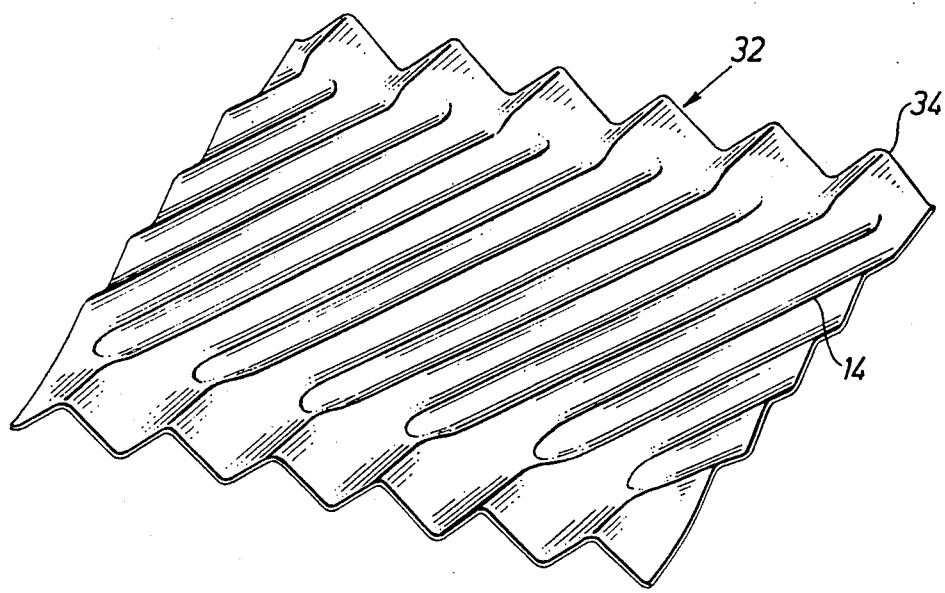
FIG. 4 shows in a perspective view similar to FIG. 3 still another embodiment of a sheet forming part of a contact body according to the invention.

In FIG. 4 there is shown a sheet or foil 32 of a type similar to that shown in FIG. 3, i.e. having folds of desired height extending obliquely over the surface of the sheet and increased edge folds 14 which define the spacing between the crests of the folds 14. However, in the embodiment shown in the FIG. 4, the edge folds 34 are positioned at an angle in relation to the folds 14 in such a manner that they extend in parallel to the lateral edges of the rectangular sheet 32 and substantially are directed in the direction of flow of the media streaming in counterflow over the surface of the sheet 32, water and air, for example.

Obviously, the invention is not limited to the embodiments shown in the drawings, but may be varied within the scope of the subsequent claims. Thus, it is possible to bring about the desired spacing between the folds 14 of the sheets by other means, such as dotted or rod-shaped impressions in the sheets.

I claim:

1. An insertable contact body for e.g. scrubbers, heat exchangers, cooling towers or the like, which contact body comprises sheets provided with folds or corrugations and which are disposed adjacent one another in such a manner that the folds in adjacent sheets form an angle with each other, characterized in that the sheets are provided with distance members by means of which they are kept at such a distance from one another that at least a major portion of those folds in adjacent sheets which form an angle with each other are positioned with an interspace between their crests without bearing against one another, wherein the sheets in the substantially major part of their edge portions are formed with edge folds which have greater fold height than the other folds in the contact body and that these edge folds bear against one another in adjacent sheets, and wherein the edge folds are aligned with and constitute continuations of the other folds of the sheets.

2. A contact body according to claim 1, c h a r a c t e r i z e d in that the edge folds in adjacent sheets cross each other and are interconnected at the crossing places.

3. An insertable contact body for e.g. scrubbers, heat exchangers, cooling towers or the like, which contact body comprises sheets provided with folds or corrugations and which are disposed adjacent one another in such a manner that the folds in adjacent sheets form an angle with each other, characterized in that the sheets are provided with distance members by means of which they are kept at such a distance from one another that at least a major portion of those folds in adjacent sheets which form an angle with each other are positioned with an interspace between their crests without bearing against one another, wherein the sheets are provided with narrow plane portions extending between two opposed edges of the sheets and abutting distance members in the shape of strips, which, if desired, are connected with the plane portions of the sheets.

4. A contact body according to claim 3, c h a r a c t e r i z e d in that the plane portions extend substantially in the main direction for the medium or the media passing through the contact body.

5. An insertable contact body for e.g. scrubbers, heat exchangers, cooling towers or the like, which contact body comprises sheets provided with folds or corrugations and which are disposed adjacent one another in such a manner that the folds in adjacent sheets form an angle with each other, characterized in that the sheets are kept at such a distance from one another that at least a major portion of those folds in adjacent sheets which form an angle with each other are positioned with an interspace between their crests without bearing against one another, wherein the sheets are formed with regularly reappearing folds which have greater fold height than the other folds in the sheets and which at the crossing places bear against one another, the folds located between the folds of greater height being situated with the named spacing in relation to one another.

6. A contact body according to claim 5, wherein the folds which have greater fold height are connected with one another at the crossing places.

7. A contact body according to one of claims 1, 3, 5, 2, or 4, characterized in that the height of the substantially major part of the folds of the sheet is contained in the region of 10 to 20 mms. and that the average distance between the centre lines of the adjacent sheets is about 15 to 30 mms.

8. A contact body according to claim 7, wherein the height of the substantially major part of the folds of the sheet is about 12 mms. and the average distance between the center lines of the adjacent sheets is about 20 mms.

* * * * *